(12) United States Patent
Kim

(10) Patent No.: US 8,839,304 B2
(45) Date of Patent: Sep. 16, 2014

(54) METHOD AND SYSTEM FOR SHARING CHANNEL MAP OF DIGITAL BROADCAST IN HOME NETWORK

(75) Inventor: Ki Young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 312 days.

(21) Appl. No.: 12/955,121

(22) Filed: Nov. 29, 2010

(65) Prior Publication Data

US 2011/0138425 A1 Jun. 9, 2011

(30) Foreign Application Priority Data

Dec. 3, 2009 (KR) ........................ 10-2009-0119255

(51) Int. Cl.
*H04N 5/445* (2011.01)
*H04N 21/436* (2011.01)
*H04N 21/438* (2011.01)
*H04N 21/47* (2011.01)

(52) U.S. Cl.
CPC ..... *H04N 21/43615* (2013.01); *H04N 21/4383* (2013.01); *H04N 21/47* (2013.01)
USPC ................... 725/56; 725/35; 725/39; 725/46; 725/58; 725/59; 725/93; 725/109; 725/110

(58) Field of Classification Search
USPC ........ 725/35, 56, 58, 59, 93, 109, 110, 39, 46
See application file for complete search history.

(56) References Cited

U.S. PATENT DOCUMENTS

| 6,405,248 B1 * | 6/2002 | Wood ............................ 709/223 |
| 2004/0163127 A1 * | 8/2004 | Karaoguz et al. ............. 725/120 |
| 2008/0313682 A1 * | 12/2008 | Kajiura ........................... 725/93 |

* cited by examiner

*Primary Examiner* — Jivka Rabovianski
(74) *Attorney, Agent, or Firm* — Jefferson IP Law, LLP

(57) ABSTRACT

A method and system for a plurality of devices to share a channel map of digital broadcast in a home network is provided. In a system and method for sharing a channel map of digital broadcast in a home network according to the present invention, a Remote User Interface Server (RUIS) stores a channel map including an occupied count field for indicating a number of devices using each of a plurality of digital broadcast channels and an occupier indicator field including indicators of the devices using corresponding digital broadcast channels, and at least one Remote User Interface Client (RUIC) as one of the devices receives and displays the channels for which occupier indicator fields include the occupier indicator of the RUIC.

14 Claims, 11 Drawing Sheets

FIG. 3A

| Channel | Channel Info | Occupied Count | Occupier Indicator |
|---------|--------------|----------------|---------------------|
| CH 1    | I1           | 3              | Value or U. H. P    |
| CH 2    | I2           | 2              | Value or U. H. P    |
| CH 3    | I3           | 1              | Value or U. H. P    |

FIG. 3B

| ASSIGNED BIT | 1 | 2 | 3 | 4 | 5 | 6 | 7 | 8 |
|--------------|---|---|---|---|---|---|---|---|
| FLAG VALUE   | 1 | 0 | 1 | 0 | 0 | 0 | 0 | 0 |

METHOD AND SYSTEM FOR SHARING
CHANNEL MAP OF DIGITAL BROADCAST
IN HOME NETWORK

PRIORITY

This application claims the benefit under 35 U.S.C. §119 (a) of a Korean patent application filed on Dec. 3, 2009 in the Korean Intellectual Property Office and assigned Serial No. 10-2009-0119255, the entire disclosure of which is hereby incorporated by reference.

BACKGROUND OF THE INVENTION

1. Field of the Invention

The present invention relates to digital broadcasts. More particularly, the present invention relates to a method and system for a plurality of devices to share a channel map of digital broadcast channels in a home network.

2. Description of the Related Art

Digital broadcasts can be classified into digital terrestrial broadcasts, digital satellite broadcasts, and cable digital broadcasts. The program data of individual channels are compressed based on an encoding standard, such as Moving Picture Experts Group (MPEG), and multiplexed according to a specific digital modulation scheme for transmission efficiency. For this reason, the digital broadcast system has no need of a plurality of repeaters that would be needed in an analog broadcast system.

A conventional TV or set-top box is configured to add/delete a channel scanned by its tuner to/from the channel map. With technical advances of residential home networks, the advent of infrastructure available for sharing a real time broadcast stream in the home network has caused a problem of addition/deletion of channels by multiple users, and thus there is a desire to develop a method for multiple users to share a channel map without collision in such environment.

Typically, the channel information is managed in the form of a table or a linked list, and a channel can be added or deleted from the channel map automatically in the frequency tuning process or according to the user's intention. When the same channel map is shared by a plurality of users, the modification of the channel map by a user is likely to interfere with other users.

SUMMARY OF THE INVENTION

An aspect of the present invention is to address at least the above-mentioned problems and/or disadvantages and to provide at least the advantages described below. Accordingly, an aspect of the present invention is to provide a method and system for a plurality of devices to share a channel map of digital broadcast channels in a home network that enables the devices to modify the channel map without influencing operation of other devices and managing channel information storage space efficiently.

In accordance with an aspect of the present invention, a system for sharing a channel map of digital broadcast in a home network is provided. The system includes a Remote User Interface Server (RUIS) for storing a channel map including an occupied count field for indicating a number of devices using each of a plurality of digital broadcast channels and an occupier indicator field including indicators of the devices using corresponding digital broadcast channels, and at least one Remote User Interface Client (RUIC) as one of the devices, for receiving and displaying the channels for which occupier indicator fields include the occupier indicator of the RUIC.

In accordance with another aspect of the present invention, a channel map sharing apparatus of a Remote User Interface server (RUIS) for digital broadcast in a home network is provided. The apparatus includes a storage unit for storing a channel map having an occupied count field for indicating a number of Remote User Interface Clients (RUICs) using each of a plurality of digital broadcast channels and an occupier indicator field including indicators of the RUICs using corresponding digital broadcast channels, a channel processor for extracting channels for which the occupier indicator of the RUIC is included from the channel map in response to a request of the RUIC, and a home network communicator for transmitting the extracted channels.

In accordance with another aspect of the present invention, a channel map sharing apparatus of a Remote User Interface Client (RUIC) for digital broadcast in a home network is provided. The apparatus includes a channel processing module for generating a request message for requesting channels for which a channel occupier indicator of the RUIC is included in a channel map which is stored in the a Remote User Interface Server (RUIS), the channel map including an occupied count field for indicating a number of Remote User Interface Clients (RUICs) using each of a plurality of digital broadcast channels and an occupier indicator field including indicators of the RUICs using corresponding digital broadcast channels, a home network communication module for transmitting the request message to the RUIS and for receiving the channels for which the occupier indicator of the RUIC is included in the channel map, and a display module for displaying channels received in response to the request message.

In accordance with another aspect of the present invention, a method for sharing a channel map of digital broadcast in a home network is provided. The method includes connecting a Remote User Interface Client (RUIC) to a Remote User Interface Server (RUIS) having a channel map, the channel map including an occupied count field for indicating a number of Remote User Interface Clients (RUICs) using each of a plurality of digital broadcast channels and an occupier indicator field including indicators of the RUICs using corresponding digital broadcast channels, and displaying, at the RUIC, the channels for which the occupier indicator of the RUIC is included from the channel map, the channels being received from the RUIS.

In accordance with another aspect of the present invention, a channel map sharing method of a Remote User Interface Server (RUIS) for digital broadcast in a home network is provided. The method includes storing a channel map having an occupied count field for indicating a number of Remote User Interface Clients (RUICs) using each of a plurality of digital broadcast channels and an occupier indicator field including indicators of the RUICs using corresponding digital broadcast channels, extracting channels for which the occupier indicator of the RUIC is included from the channel map in response to a request of the RUIC, and transmitting the extracted channels to the RUIC.

In accordance with another aspect of the present invention, a channel map sharing method of a Remote User Interface Client (RUIC) for digital broadcast in a home network is provided. The method includes generating a request message for requesting channels for which a channel occupier indicator of the RUIC is included in the channel map which is stored in the a Remote User Interface Server (RUIS), the channel map including an occupied count field for indicating a number of Remote User Interface Clients (RUICs) using each of a plurality of digital broadcast channels and an occupier indicator field including indicators of the RUICs using corresponding digital broadcast channels, transmitting the request message to the RUIS and receives the channels for which the occupier indicator of the RUIC is included in the channel map, and displaying channels received in response to the request message.

In accordance with another aspect of the present invention, a method of updating a channel map stored in a Remote User Interface Server (RUIS) is provided. The method includes receiving a request from a Remote User Interface Client (RUIC) to add or delete a channel from the channel map, the channel map including an occupier count field indicating a number of RUICs using each of a plurality of digital broadcast channels and an occupier indicator field including indicators of the RUICs using corresponding digital broadcast channels, and updating the channel map based on the received request.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3A is a diagram illustrating a channel map configured in a form of a table according to an exemplary embodiment of the present invention;

FIG. 3B is a diagram illustrating a format of an occupier indicator field of a channel map according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method for sharing a channel map among a plurality of systems and/or devices in a residential home network environment in which a set-top box or a TV which processes a broadcast stream in real time provides other devices with the real time broadcast stream.

Figure 1:
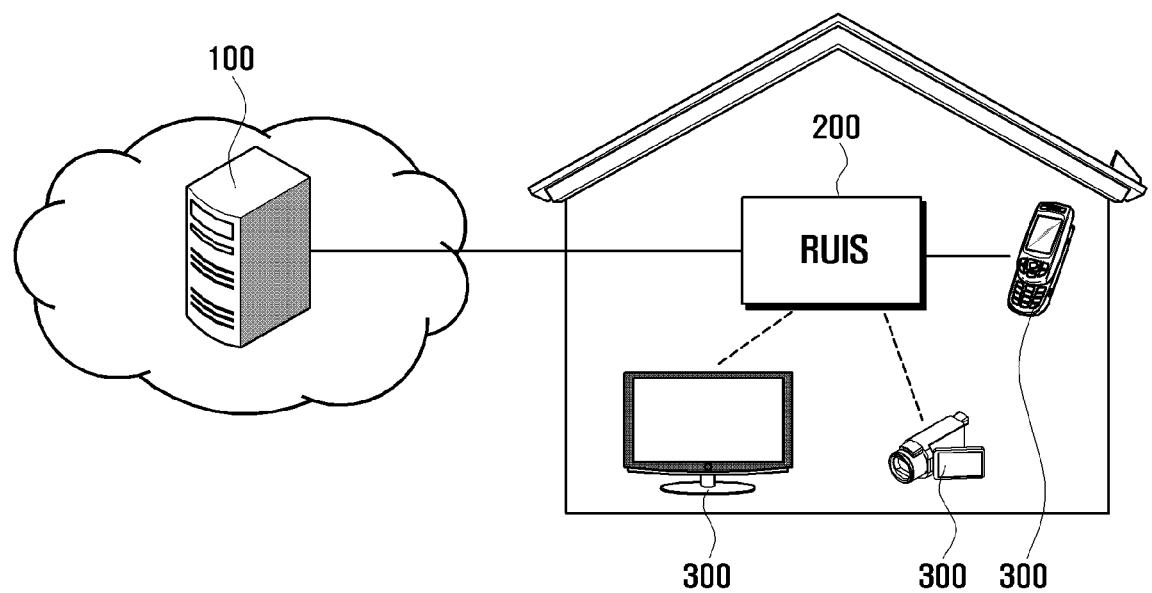
FIG. 1 is a schematic diagram illustrating a topology of a digital broadcast system in a home network according to an exemplary embodiment of the present invention.

FIG. 1 is a schematic diagram illustrating a topology of a digital broadcast system in a home network according to an exemplary embodiment of the present invention.

Referring to FIG. 1, the digital broadcast system according to an exemplary embodiment of the present invention includes a headend 100, a Remote User Interface server (RUIS) 200, and a Remote User Interface Client (RUIC) 300.

The RUIS 200 may be a set-top box. The RUIS 200 receives the digital broadcast and the supplementary data of the digital broadcast from the headend 100 directly.

The RUIC 300 may be any of a TV, a mobile communication terminal, an audio device, and the like. The RUIC 300 receives the digital broadcast and supplementary data of the digital broadcast from the headend indirectly via the RUIS 200.

The RUIS 200 and RUIC 300 may communicate with each other according to a home network communication protocol. According to an exemplary embodiment of the present invention, the RUIS 200 and the RUIC 300 share the channel map.

Figure 2:
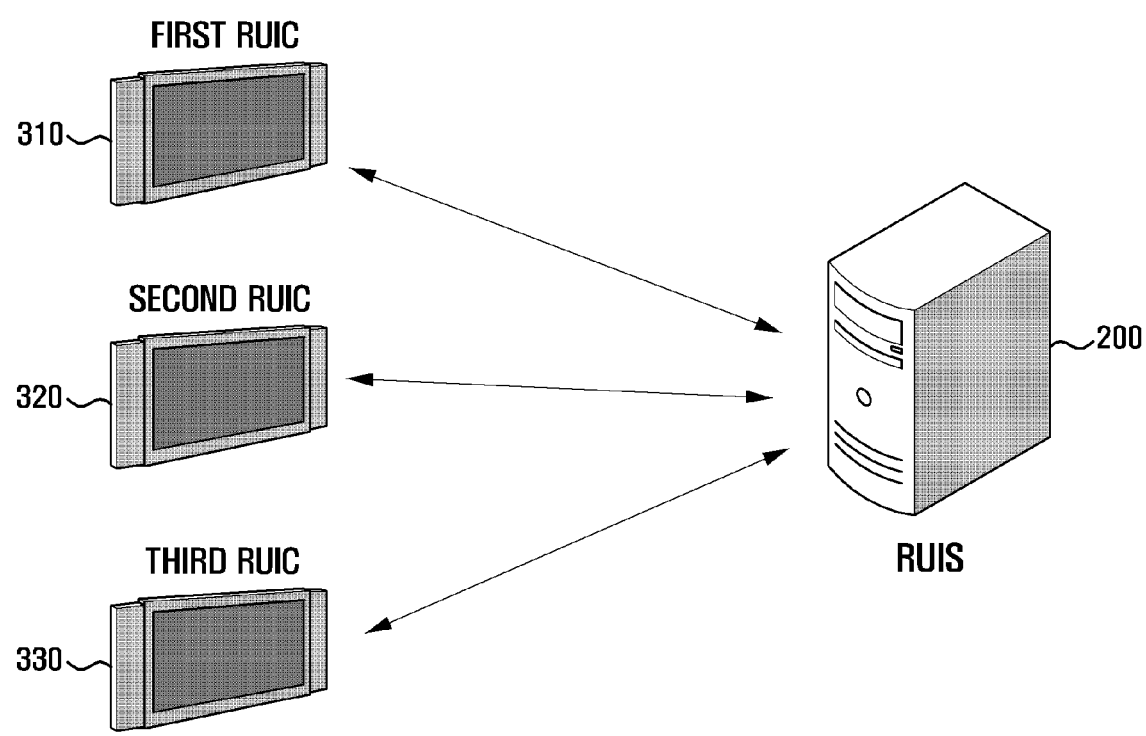
FIG. 2 is a diagram illustrating a topology of a home network according to an exemplary embodiment of the present invention.

FIG. 2 is a diagram illustrating a topology of a home network according to an exemplary embodiment of the present invention.

Referring to FIG. 2, the home network includes an RUIS 200 and a plurality of RUICs. In FIG. 2, three (3) RUICs, first RUIC 310, second RUIC 320, and third RUIC 330 are depicted. The first to third RUICs 310, 320, and 330 receive digital broadcast from the RUIS 200. The first to third RUICs 310, 320, and 330 share the channel map preserved in the RUIS 200. Each of the first to second RUIC 310, 320, and 330 may request the RUIS 200 for the channel map to modify it and use the modified channel map.

According to an exemplary embodiment of the present invention, each of the first to third RUICs 310, 320, and 330 may modify the received channel map into an RUIC-specific channel map. The RUIC-specific channel maps of the first to third RUICs 310, 320, and 330 do not influence each other. For example, if the first RUIC 310 modifies the channel map shared by the first to third RUICs 310, 320, and 330, the modified channel map, i.e. the RUIC-specific channel map of the RUIC 310, does not influence the RUIC-specific channel maps of the second and third RUICs 320 and 330.

FIG. 3A is a diagram illustrating a channel map configured in a form of a table according to an exemplary embodiment of the present invention, and FIG. 3B is a diagram illustrating a format of an occupier indicator field of a channel map according to an exemplary embodiment of the present invention.

Figure 4A:
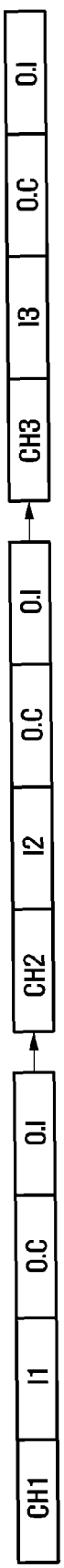
FIG. 4A is a diagram illustrating a channel map configured in a form of a linked list according to an exemplary embodiment of the present invention.
Figure 4B:
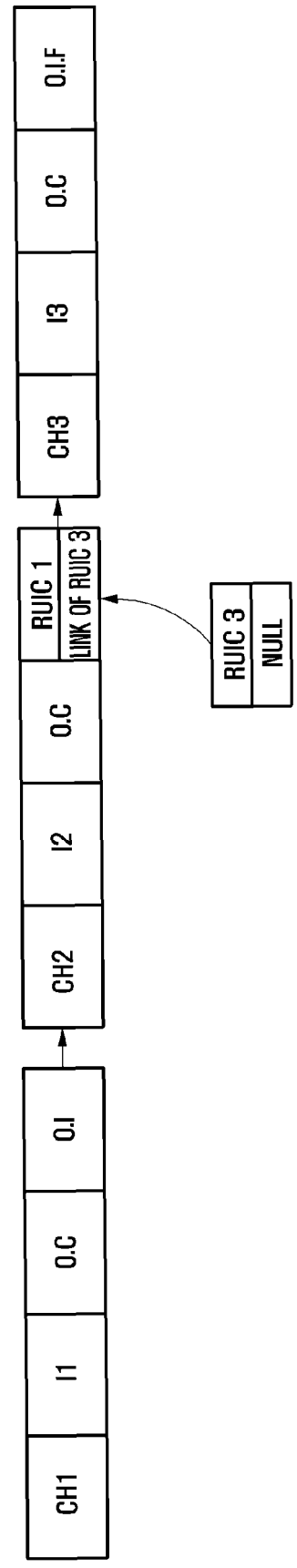
FIG. 4B is a diagram illustrating a format of an occupier indicator field of the channel map according to an exemplary embodiment of the present invention.

FIG. 4A is a diagram illustrating a channel map configured in a form of a linked list according to an exemplary embodiment of the present invention, and FIG. 4B is a diagram illustrating a format of an occupier indicator field of a channel map according to an exemplary embodiment of the present invention.

Referring to FIGS. 3A and 4A, the channel maps configured in the form of a table and a linked list includes a channel field, a channel information field, an occupied count field, and an occupier indicator field. The channel field contains the channel number identified according to the transmission resource (time and frequency) on which the digital broadcast signal is received.

The channel information field contains the broadcast channel identifier mapped to a channel identified according to the transmission resource. Since one physical channel is typically mapped to one broadcast channel, the exemplary embodiments described herein are made under the assumption that the physical channel and the broadcast channel are identical with each other. However, according to another exemplary embodiment of the present invention, one physical channel may be used to transmit a plurality of broadcast channels.

The occupied count field contains a number of RUICs using the corresponding channel. This value is referred to as an "occupied count".

The occupier indicator field contains an indicator of the RUIC occupying the corresponding channel. When an RUIC is connected to the RUIS 200, the RUIS 200 assigns an occupier indicator to the connected RUIC.

Referring to FIG. 3B, when the channel map is configured in the form of a table, the occupier indicator field expresses the indicator of the occupier indicator of each RUIC with a bitmap in which each bit has a flag value indicating whether the corresponding channel is occupied.

When a maximum number of RUICs occupying the corresponding channel is predetermined, the occupier indicator is limited by the maximum number of RUICs. The occupier indicator may use a bitmap in units of bytes. When the occupier indicator field uses a bitmap of 1 byte, 8 RUIC indicators may be carried. Assuming that the first and third bits indicate different RUICs that occupy the corresponding channel and other RUICs do not use the corresponding channel, the first and third bits are set to a flag value "1", and the remaining bits are set to flag value "0", as shown in FIG. 3B.

Referring to FIG. 4B, when the channel map is configured in the form of a linked list, the occupier indicator field connects the fields containing the indicators of the RUICs using the corresponding channel. In order to use the channel without defining the maximum number of RUICs, the channel map is used in the form of a linked list.

Assuming that channel 2 (CH2) is occupied by two RUICs assigned the respective indicators "RUIC1" and "RUIC2", the occupier indicators of the RUICs using the channel 2 are linked in the occupier indicator field as shown in FIG. 4B.

When the channel map is configured in the form of a linked list, each RUIC 300 may extract only the needed channel with the occupier indicator assigned in the channel map. In the case of the channel map configured in the form of a table, the channel scanning time decreases due to the use of the occupier indicators of the corresponding RUICs. In view of the number of occupier indicators, the channel map configured in the form of a linked list may be advantageous.

The RUIS 200 according to an exemplary embodiment of the present invention is described below.

Figure 5:
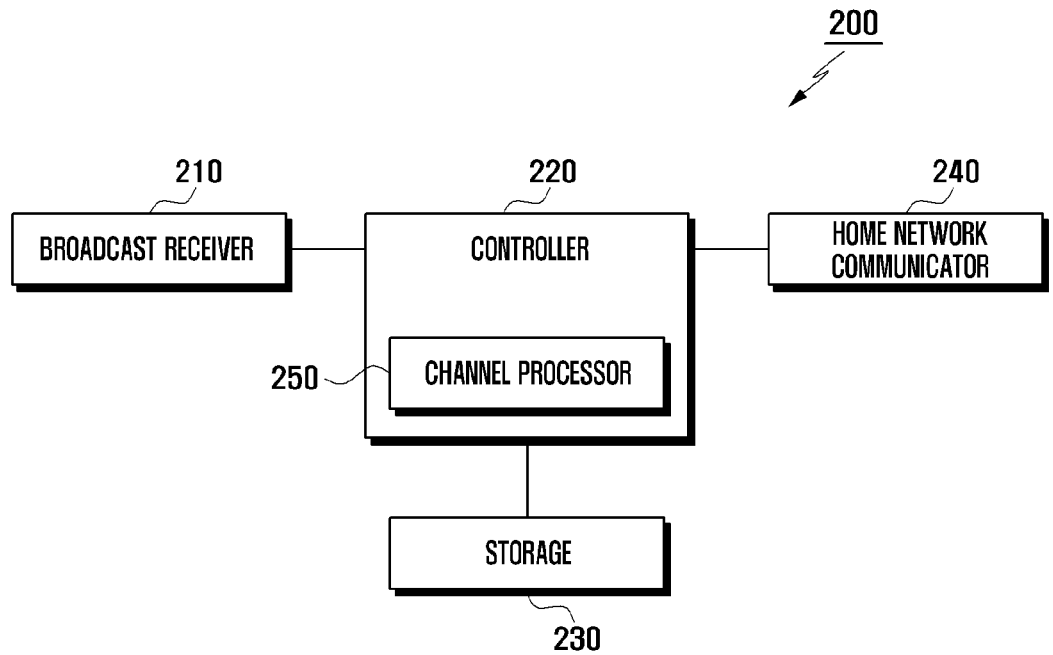
FIG. 5 is a block diagram illustrating a configuration of a Remote User Interface Server (RUIS) according to an exemplary embodiment of the present invention.

FIG. 5 is a block diagram illustrating a configuration of a RUIS according to an exemplary embodiment of the present invention.

Referring to FIG. 5, the RUIS 200 is a device which is connected to the headend 100 directly for receiving the digital broadcast service and may be represented by a set-top box. The RUIS 200 includes a broadcast receiver 210, a controller 220, a storage unit 230, and a home network communicator 240. The controller 220 includes a channel processor 250.

The broadcast receiver 210 receives digital broadcast data from the headend 100. The digital broadcast data includes the digital broadcast content transmitted on the broadcast channel and supplementary data transmitted on another channel, e.g. a control channel. The broadcast receiver 210 also delivers the received digital broadcast data to the controller 220.

The controller 220 delivers the digital broadcast data received by the broadcast receiver to an external device, i.e. the RUIC 300, via the home network communicator 240 in response to the request of the RUIC 300. The controller 220 includes a channel processor 250 which is responsible for performing the channel map-related functions according to an embodiment of the present invention.

The channel processor 250 is also responsible for processing the supplementary data received with the digital broadcast data into an appropriate format and stores the processed data in the storage unit 230. For example, the supplementary data may be the channel map, and the channel map may be processed in the form of a table or a linked list and then stored in the storage unit 230.

The channel processor 250 is capable of editing the channel map according to the request from the RUIC 300. The channel processor 250 may deliver the channel map to the RUIC 300, if required, via the home network communicator 240. According to an exemplary embodiment of the present invention, the channel processor 250 may receive various kinds of requests for editing the channel map through the home network communicator and edit the channel in response to the requests.

When the RUIS 200 is connected to a specific RUIC 300 via the home network communicator 240, the channel processor 250 assigns an indicator to the connected RUIC 300. When the connection with the RUIC 300 is released, the channel processor 250 may withdraw the indicator assigned to the corresponding RUIC 300.

When a channel is requested to be added by an RUIC 300, the channel processor 250 determines whether the corresponding channel exists in the channel map. If the corresponding channel does not exist, the channel processor 250 adds the channel to the channel map. Otherwise, if the channel exists in the channel map, the channel processor 250 increments the occupied count by one and adds the occupier indicator of the corresponding RUIC 300 to the occupier indicator field.

When a channel is requested to be deleted by an RUIC 300, the channel processor 250 determines a number of the RUICs using the corresponding channel. If the corresponding channel is used by only one RUIC, the channel processor 250 deletes the channel from the channel map. Otherwise, if the corresponding channel is used by more than two RUICs, the channel processor 250 decrements the occupied count by one and deletes the occupier indicator of the corresponding RUIC from the occupier indicator field.

The storage unit 230 stores various types of data required for providing the digital broadcast service, including a channel map.

The home network communicator 240 is responsible for communicating with the RUIC 300 using a communication protocol appropriate for the home network communication. The home network communicator 240 receives the digital broadcast data from the controller 220 and transmits the received digital broadcast data to the RUIC 300 using the protocol appropriate for the home network communication. The home network communicator 240 receives the various requests for editing the channel map and requests for the channel map itself from the RUIC 300, and delivers the received requests to the controller 220.

Figure 6:
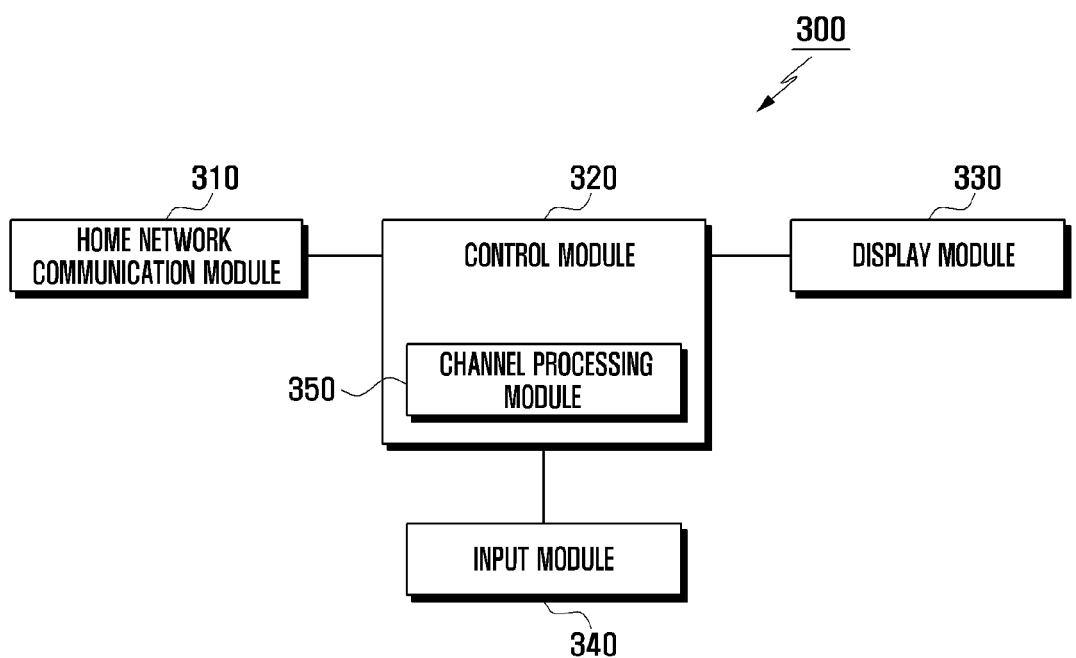
FIG. 6 is a diagram illustrating a configuration of a Remote User Interface Client (RUIC) according to an exemplary embodiment of the present invention.

FIG. 6 is a diagram illustrating a configuration of an RUIC according to an exemplary embodiment of the present invention.

Referring to FIG. 6, the RUIC 300 is a device which may receive digital broadcast data from the RUIS 200 through a home network and play and display the received digital broadcast data. The RUIC 300 includes a home network communication module 310, a control module 320, a display module 330, and an input module 340. The control module 320 includes a channel processing module 350.

The home network communication module 310 is responsible for communicating with the RUIS 200 with a protocol appropriate for home network communication. The home network communication module 310 may receive digital broadcast data from the RUIS 200 and deliver the received digital broadcast data to the control module 320. The home network communication module 310 may also receive the channel map edit requests, such as channel scan, addition, and deletion requests, and transmits channel map requests to the RUIS 200. The home network communication module 310 may receive its channel map from the RUIS 200 in response to the channel map request.

The control module 320 controls such that the digital broadcast data provided by the home network communication module 310 is displayed on the display module 330. For this purpose, the control module 320 includes a codec for processing the digital data encoded in a predetermined format. The control module 320 is also responsible for managing the channel map via the channel processing module 350 according to an exemplary embodiment of the present invention.

The channel processing module 350 processes the channel map received by the home network communication module 310 and displays the processed channel map on the display module 330.

The display module 330 is a display device for displaying digital data in a format appropriate for the display module 330. The display module 330 is also responsible for displaying the digital broadcast data played under the control of the control module 320. The display module 330 may be represented by a Liquid Crystal Display (LCD). When the display module is implemented with an LCD, the display module 330 includes an LCD operation driver and an LCD panel.

The input module 340 is a device for providing the user with an input interface and provided with a plurality keys for receiving user requests. The input module 340 generates signals for channel scan, channel addition, and channel deletion in response to the user's key manipulation and transfers the signals to the control module 320. In response to the user input for displaying available channels, the input unit 340 generates a signal corresponding to the user input and sends the signal to the control module 320. The control module 320 may request the RUIC 300 for the RUIC-specific channel map via the home network module 310.

Figure 7:
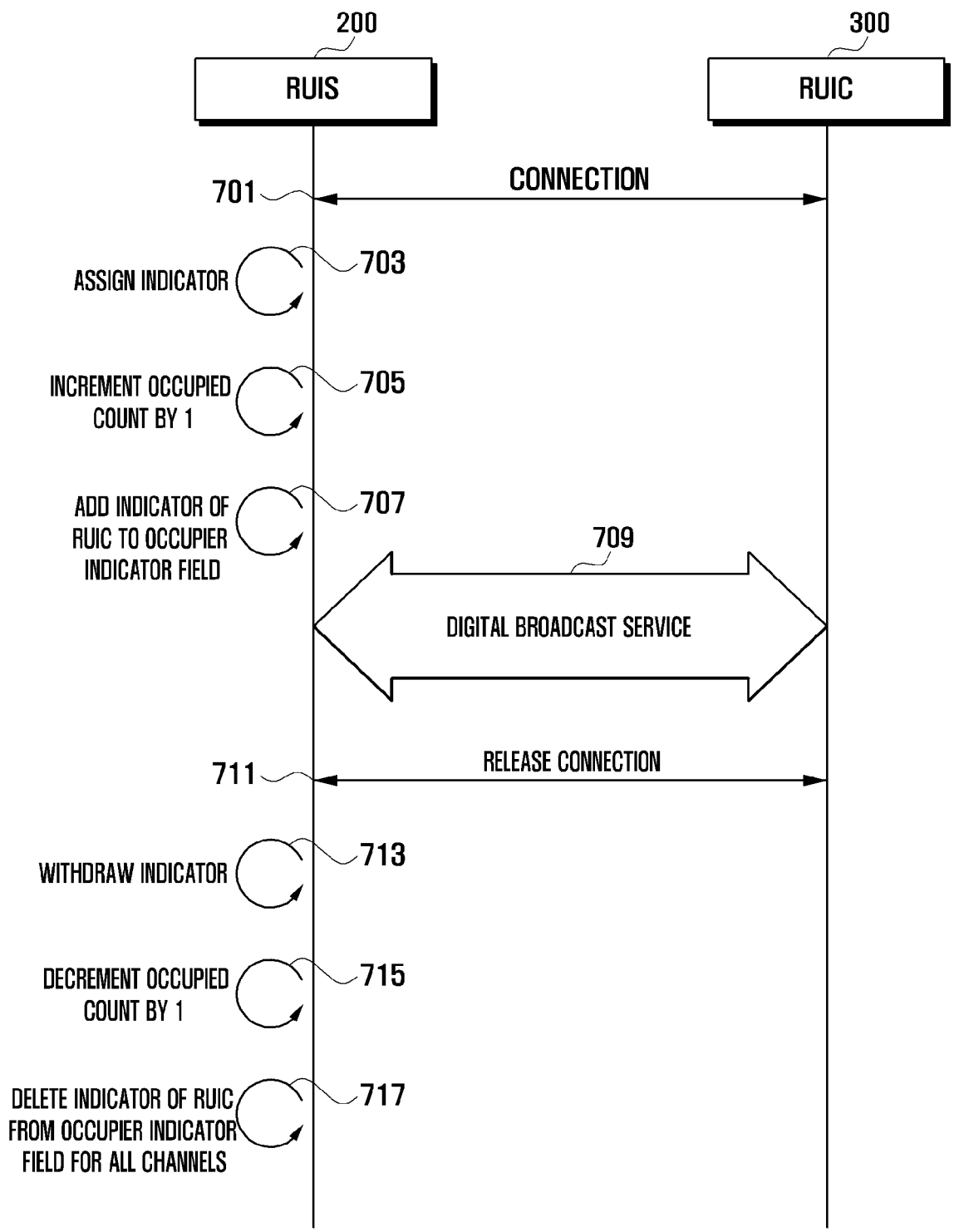
FIG. 7 is a signaling diagram illustrating operations of an RUIS and RUIC for a channel map sharing method according to an exemplary embodiment of the present invention.

FIG. 7 is a signaling diagram illustrating operations of an RUIS and RUIC for a channel map sharing method according to an exemplary embodiment of the present invention.

Referring to FIG. 7, an RUIC 300 connects to the RUIS 200 in step 701. For a home network operating with the UPnP protocol, the RUIS 200 and RUIC 300 may be connected through an UPnP discover process.

When the RUIC 300 is connected to the RUIS 200, the RUIS 200 assigns an indicator to connected RUIC 300 in the channel map in step 703. The RUIS 200 increments the occupied count by one in the occupied count field of the channel map in step 705.

In step 707, the RUIS 200 adds the occupier indicator of the RUIC 300 to the occupier indicator field of the channel map. When the channel map is configured in the form of a table, the RUIS 200 sets the flag value of the bitmap corresponding to the RUIC to "1" in the occupier indicator field. When the channel map is configured in the form of a linked list, the RUIS 200 adds a link representing the corresponding RUIC 300.

Steps 701 to 707 are initial operations that are performed whenever an RUIC 300 is connected to the RUIS 200. When these initial operations have been completed, the RUIS 200 provides the RUIC with the digital broadcast service received from the headend 100 in step 709.

The RUIC 300 receives the digital broadcast service from the RUIS 200 in step 709. If a channel map request is received while providing the digital broadcast service, the RUIS 200 extracts the channels mapped to the indicator of the RUIC 300 which has requested the channel map and provides the RUIC 300 with the channel map including the extracted channels. The RUIC 300 may also edit the channel map by scanning a channel or by adding and/or deleting specific channels in communication with the RUIS 200 at step 709. The RUIC 300 may share the edited channel map with other RUICs to which it is currently connected. If the RUIC 300 requests the RUIS 200 for its channel map, the RUIS 200 generates an RUIC-specific channel map including the channels having the indicator of the RUIC from the original channel map and sends the RUIC-specific channel map to the corresponding RUIC 300.

The editing of the channel or RUIC-specific channel map extraction and transmission may be performed according to the request of the RUIC 300. The RUIC's request occurs according to the user's intention regardless of temporal order. Descriptions of the channel map display method and the channel map edit method, including channel scan, addition, and deletion, are provided below.

While the RUIC 300 is receiving the digital broadcast service from the RUIS 200, the connection between the RUIC 300 and the RUIS 200 may be released in step 711. If the connection between RUIC 300 and the RUIS 200 is released, the RUIS 200 withdraws the indicator assigned to the RUIC 300 in step 713.

The RUIS 200 decrements the value of the occupied count field by one in the channel map in step 715. If the value of occupied count field is 0, the RUIS 200 resets the value of the occupied count field to "−1" in step 717.

In step 717, the RUIS 200 removes the indicator of the corresponding RUIC 300 from the occupier indicator field of all the channels existed in the channel map. When the channel map is configured in the form of a table, the RUIS 200 sets the flag value of the bitmap, which corresponds to RUIC 300, to "0" in the occupier indicator field. When the channel map is configured in the form of a linked list, the RUIS 200 deletes the link representing the corresponding RUIC 300.

How an RUIC scans, adds, and deletes channels in its RUIC-specific channel map is described below. A description of a channel scanning procedure according to an exemplary embodiment of the present invention is described below with respect to FIGS. 8A and 8B.

Figure 8A:
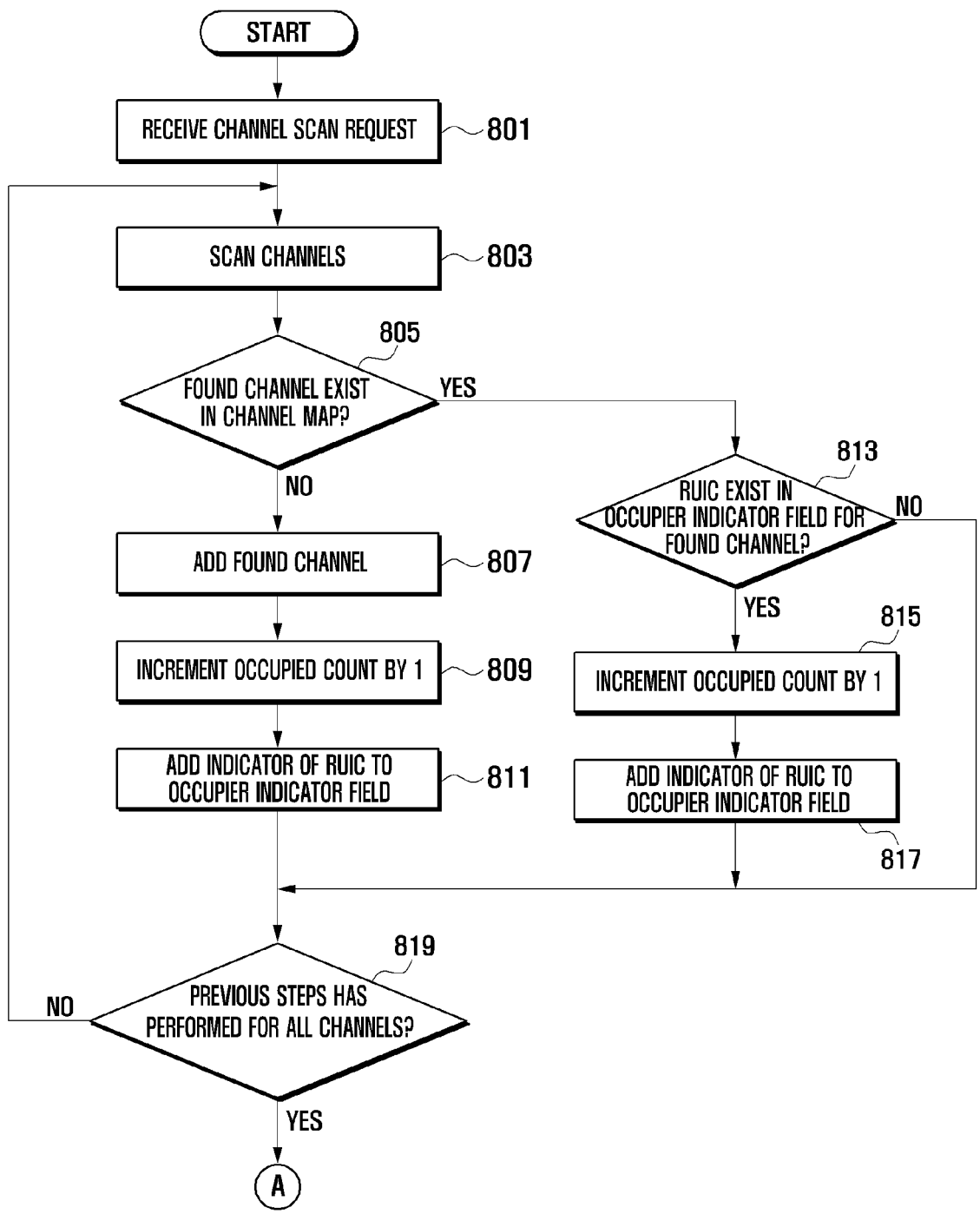
FIGS. 8A and 8B are flowcharts illustrating a channel scanning procedure of a channel map sharing method according to an exemplary embodiment of the present invention.
Figure 8B:
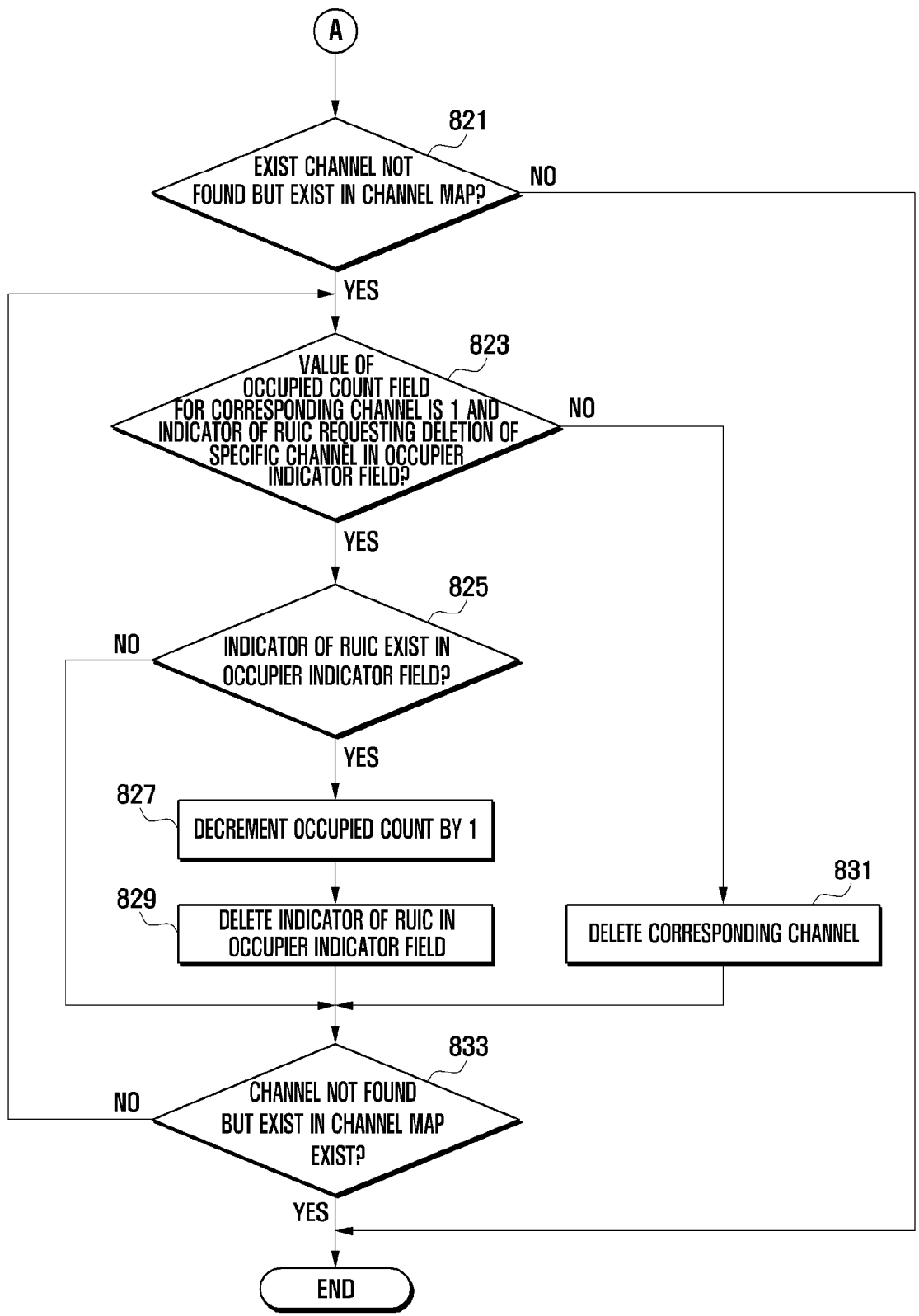

FIGS. 8A and 8B are flowcharts illustrating a channel scanning procedure of a channel map sharing method according to an exemplary embodiment of the present invention.

Referring to FIGS. 8A and 8B, the RUIS 200 receives a channel scanning request from an RUIC 300 in step 801. Upon receipt of the channel scanning request, the RUIS 200 scans channels on which the digital broadcast signals are received in step 803. The RUIS 200 determines whether each of the scanned channels exists in the channel map in step 805. If the channel does not exist in the channel map, the RUIS 200 adds the channel to the channel map in step 807. The RUIS 200 increments the value of the occupied count by one in step 809. The RUIS 200 adds the occupier indicator of the RUIC 300, which has requested the channel scanning, to the occupier indicator field of the channel map in step 811.

Otherwise, if the channel exists in the channel map, the RUIS 200 determines whether an RUIC assigned the occupier indicator corresponding to the channel exists in the channel map in step 813.

If an RUIC assigned the occupier indicator corresponding to the channel exists, the procedure goes to step 819 and, otherwise, to step 815. In step 815, the RUIS 200 increments the value of the occupied count field by one. The RUIS 200 adds the occupier indicator of the corresponding channel to the occupier indicator field of the channel map in step 817.

In step 819, the RUIS 200 determines whether all the channels have been verified through the aforementioned steps. If all the channels have been verified, the procedure goes to step 821. In step 821, the RUIS 200 determines whether a channel is not found but exists in the channel map.

If a channel is not found but exists in the channel map, the RUIS 200 determines whether the value of the occupied count field of the corresponding channel is "1" and whether the occupier indicator field includes an indicator of the RUIC requesting the deletion of a specific channel in the occupier indicator field in step 823.

If the value of the occupied count field is equal to or greater than 2 or the occupier indicator field does not include the indicator of the RUIC requesting the deletion of a specific channel in the occupier indicator field, the RUIS 200 determines whether the occupier indicator field includes the indicator of the RUIC requesting the deletion of a specific channel in step 825.

If the occupier indicator field includes the indicator of the RUIC requesting the deletion of a specific channel in the occupier indicator field, the RUIS 200 decrements the value of the occupied count field of the corresponding channel in the channel map in step 827. The RUIS 200 deletes the indicator of the corresponding RUIC 300 from the occupier indicator field of the corresponding channel in the channel map in step 829. Otherwise, if the occupier indicator field does not include the indicator of the RUIC requesting the channel scanning at step 825, the procedure goes to step 833.

If the value of the occupied count field of the corresponding channel is "1" and the occupier indicator field includes the indicator of the RUIC requesting the deletion of a specific channel in the occupier indicator field at step 823, the RUIS 200 deletes the corresponding channel in step 831.

In step 833, the RUIS 200 determines whether there is a channel which is not found but exists in the channel map. If a channel is not found but exists in the channel map, the procedure goes to step 823 and, otherwise, the procedure ends.

Figure 9:
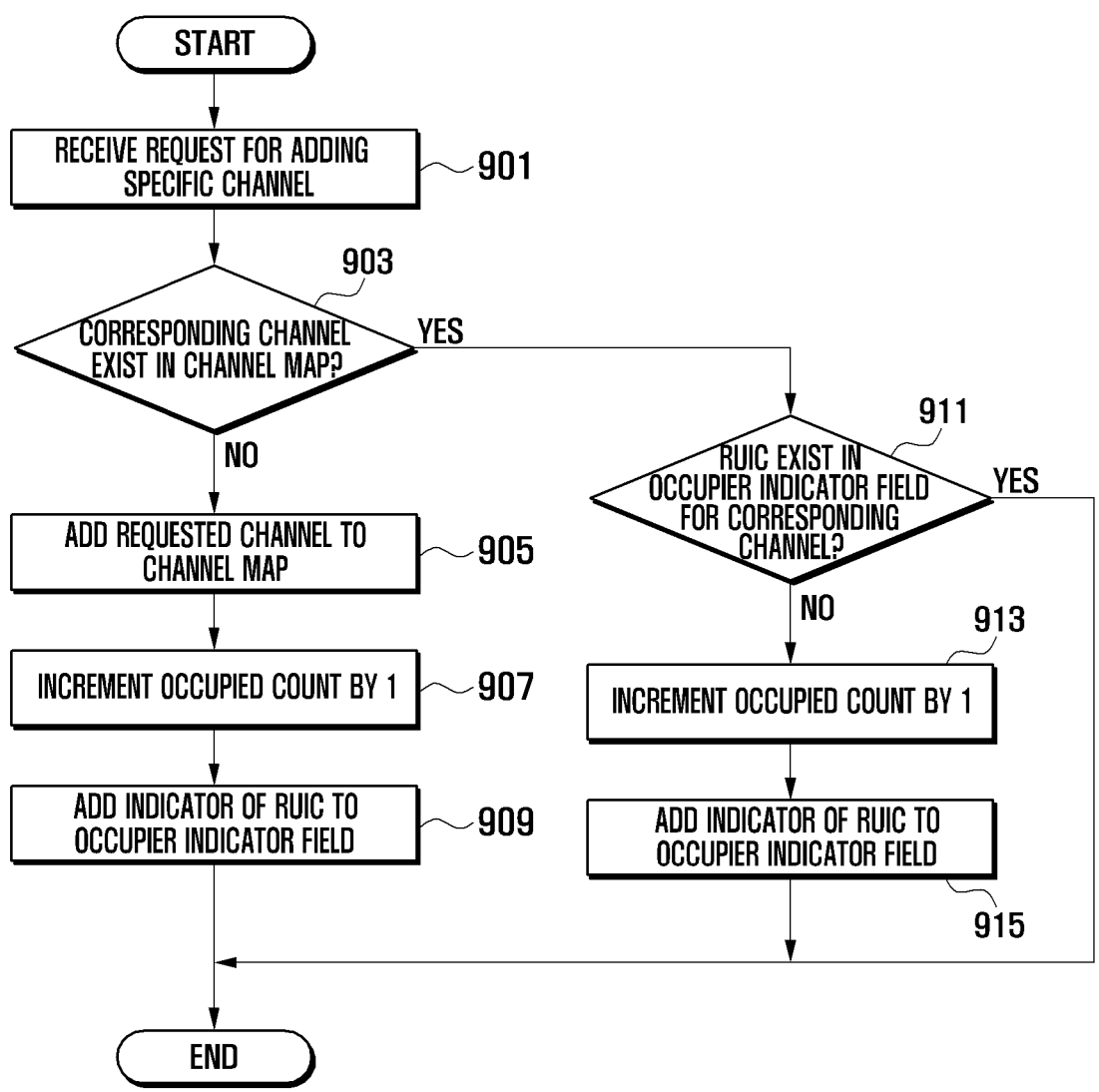
FIG. 9 is a flowchart illustrating a channel addition procedure of a channel map sharing method according to an exemplary embodiment of the present invention.

FIG. 9 is a flowchart illustrating a channel addition procedure of a channel map sharing method according to an exemplary embodiment of the present invention.

Referring to FIG. 9, the RUIS 200 receives a request for adding a specific channel from an RUIC 300 in step 901. Upon receipt of the channel addition request, the RUIS 200 determines whether the corresponding channel exists in the channel map in step 903.

If the corresponding channel does not exist in the channel map, the RUIS 200 adds the requested channel to the channel map in step 905. In step 907, the RUIS 200 increments the value of the occupied count field by one in the channel map, and in step 909 adds the occupier indicator of the RUIC to the occupier indicator field of the added channel in the channel map.

If the corresponding channel exists in the channel map, the RUIS 200 determines whether an RUIC is assigned the occupier indicator of the corresponding channel in step 911. If an RUIC is assigned the occupier indicator of the corresponding channel, the procedure ends and, otherwise, the procedure goes to step 913.

In step 913, the RUIS 200 increments the value of the occupied count field of the requested channel by reflecting the increase of the number of the RUICs. In step 915, the RUIS 200 adds the indicator of the RUIC, which requests the channel addition, to the occupier indicator field of the requested channel.

Figure 10:
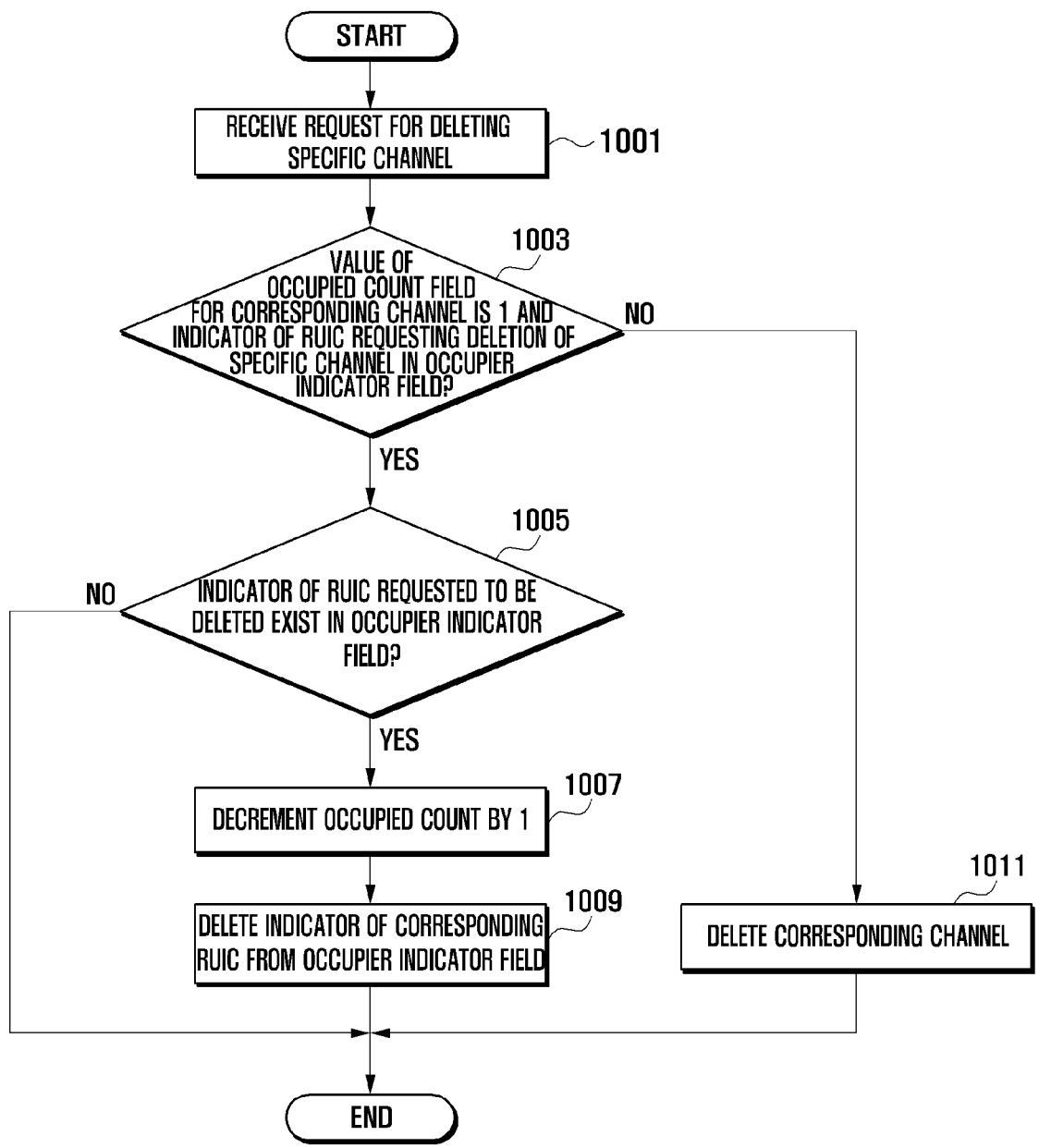
FIG. 10 is a flowchart illustrating a channel deletion procedure of a channel map sharing method according to an exemplary embodiment of the present invention.

FIG. 10 is a flowchart illustrating a channel deletion procedure of a channel map sharing method according to an exemplary embodiment of the present invention.

Referring to FIG. 10, the RUIS 200 receives a request for deleting a specific channel from an RUIC 300 in step 1001. Upon receipt of the channel deletion request, the RUIS 200 determines whether the value of the occupied count field of the corresponding field is 1 and whether the occupier indicator field includes the indicator of the RUIC requesting the deletion of the channel in step 1003.

If the value of the occupied count field is equal to or greater than 2 or the occupier indicator field does not include the indicator of the RUIC requesting the deletion of the channel in the occupier indicator field, the RUIS 200 determines whether the occupier indicator field includes the indicator of the RUIC requesting the deletion of the channel in step 1005.

If the occupier indicator field includes the indicator of the RUIC requesting the deletion of the channel, the RUIS 200 decrements the value of the occupied count of the corresponding channel by one in the channel map in step 1007. In step 1009, the RUIS 200 deletes the indicator of the corresponding RUIC 300 from the occupier indicator fields of the corresponding channel in the channel map. If the occupier indicator field does not include the indicator of the RUIC requesting the deletion of the channel, the RUIS 200 ends the procedure.

If the value of the occupied count field is 1 and the occupier indicator field includes the indicator of the RUIC requesting the deletion of the channel in the occupier indicator field, the RUIS 200 deletes the corresponding channel in step 1011.

The channel scanning, addition, and deletion procedures according to an embodiment of the present invention have been explained above. A description of a channel display procedure according to an exemplary embodiment of the present invention is described below. The channel display procedure may be performed anytime regardless of the aforementioned channel editing procedure. Each RUIC 300 may extract and use any required channels from the channel map. Each RUIC 300 may extract the channels of which occupier indicator fields include the RUIC's occupier indicator for exclusive use.

Figure 11:
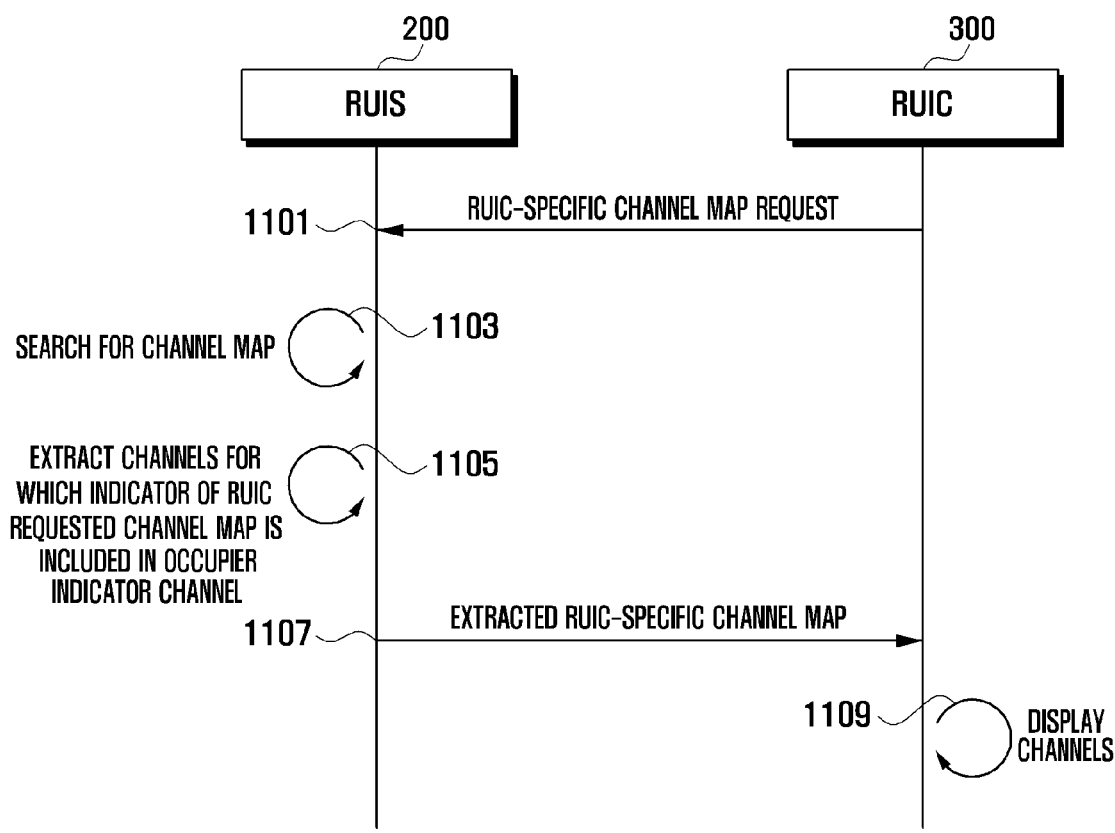
FIG. 11 is a signaling diagram illustrating operations of an RUIS and RUIC in a channel display procedure of a channel map sharing method according to an exemplary embodiment of the present invention.

FIG. 11 is a signaling diagram illustrating operations of an RUIS and RUIC in a channel display procedure of the channel map sharing method according to an exemplary embodiment of the present invention.

Referring to FIG. 11, the RUIC 300 requests the RUIS 200 for its channel map in step 1101. Upon receipt of the channel map request, the RUIS 200 searches for the channel map in step 1103 and extracts the channels of which occupier indicator fields have the indicator of the RUIC from the channel map in step 1105. The RUIS 200 sends the RUIC-specific channel map generated with the extracted channels to the RUIC 300 in step 1107.

If the RUIC-specific channel map is received, the RUIC 300 extracts and process a needed part of the RUIC-specific channel map and display the processed channel map to the user in step 1109.

As described above, the channel map sharing method and system according to an exemplary embodiment of the present invention enables the devices (RUICs) sharing channel information for receiving a real time broadcast stream in a home network to add and delete channels in the channel map without influencing among each other and improve the utilization efficiency of the channel map storage space.

While the present invention has been shown and described with reference to certain exemplary embodiments thereof, it will be understood by those skilled in the art that various changes in form and details may be made therein without departing from the spirit and scope of the present invention as defined in the appended claims and their equivalents.

What is claimed is:

1. A system for sharing a channel map of digital broadcast in a home network, the system comprising:
a Remote User Interface Server (RUIS) including a storage unit, for storing a channel map in the storage unit, the channel map including at least one digital broadcast channel, an occupied count field for indicating a number of devices using each of the at least one digital broadcast channel and an occupier indicator field including indicators of the devices using each of the at least one digital broadcast channel; and
at least one Remote User Interface Client (RUIC) as one of the devices, for receiving and displaying at least one channel for which occupier indicator fields corresponds to an occupier indicator of the RUIC,
wherein the channel map is shared by the at least one RUIC and is used for managing a digital broadcast channel list of each of the at least one RUIC through the occupied count field and the occupier indicator field,
wherein, when the RUIC requests deletion of a channel, the RUIS determines a number of RUICs using the requested channel for deletion and deletes, when the channel is used by only one RUIC, the requested channel for deletion from the channel map, and
wherein, when the channel is used by two or more RUICs, the RUIS decrements a value of the occupied count field corresponding to the requested channel for deletion by one and deletes the occupier indicator of the RUIC from the occupier indicator field corresponding to the requested channel for deletion.

2. The system of claim 1, wherein:
when the RUIC requests addition of a channel and the requested channel for addition does not exist in the channel map, the RUIS adds the requested channel for addition to the channel map, increments the value of the occupied count field for the requested channel for addition, and adds the occupier indicator of the RUIC to the occupier indicator field corresponding to the requested channel for addition; and
when the requested channel for addition exists in the channel map, the RUIS increments the value of the occupied count field for the channel by one, and adds the
occupier indicator of the RUIC to the occupier indicator field corresponding to the requested channel for addition.

3. A channel map sharing apparatus of a Remote User Interface server (RUIS) for digital broadcast in a home network, the apparatus comprising:
a storage unit configured to store a channel map comprising at least one digital broadcast channel, an occupied count field for indicating a number of Remote User Interface Clients (RUICs) using each of the at least one digital broadcast channel and an occupier indicator field including indicators of the RUICs using each of the at least one digital broadcasting channel;
a channel processor configured to extract at least one channel that an occupier indicator of the at least one channel corresponds to an occupier indicator of a RUIC from the channel map in response to a request of the RUIC; and
a home network communicator configured to transmit the extracted at least one channel to the RUIC,
wherein the channel map is shared by at least one RUIC and is used for managing a digital broadcast channel list of each of the at least one RUIC through the occupied count field and the occupier indicator field,
wherein the channel processor determines, when the RUIC requests deletion of a channel, a number of RUICs using the requested channel for deletion,
wherein the channel processor deletes, when the requested channel for deletion is used by only one RUIC, the channel from the channel map, and
wherein when the requested channel for deletion is used by two or more RUICs, the channel processor decrements a value of the occupied count field corresponding to the requested channel for deletion by one and deletes the occupier indicator of the RUIC from the occupier indicator field corresponding to the requested channel for deletion.

4. The apparatus of claim 3, wherein when the RUIC requests addition of a channel and the requested channel for addition does not exist in the channel map, the channel processor adds the requested channel for addition to the channel map, increments the value of the occupied count field corresponding to the requested channel for addition by one, and adds the occupier indicator of the RUIC to the occupier indicator field corresponding to the requested channel for addition.

5. The apparatus of claim 4, wherein when the requested channel for addition exists in the channel map, the channel processor increments the value of the occupied count field corresponding to the requested channel for addition by one, and adds the occupier indicator of the RUIC to the occupier indicator field corresponding to the requested channel for addition.

6. A channel map sharing apparatus of a Remote User Interface Client (RUIC) for digital broadcast in a home network, the apparatus comprising:
a channel processor configured to generate a request message for requesting at least one channel that a channel occupier indicator of the at least one channel corresponds to an occupier indicator of the RUIC from a channel map which is stored in the a Remote User Interface Server (RUIS), the channel map including at least one digital broadcast channel, an occupied count field for indicating a number of Remote User Interface Clients (RUICs) using each of the at least one digital broadcast channel and an occupier indicator field including indicators of the RUICs using the at least one digital broadcast channel;
a home network communicator configured to transmit the request message to the RUIS and for receiving the at least one channel; and
a display module for displaying received at least one channel,
wherein the RUIC shares the channel map with other RUICs and manage a digital broadcast channel list through the occupied count field and the occupier indicator field independently of the other RUICs, and
wherein the channel map processor generates a message requesting addition or deletion of a specific channel from the channel map and sends the request message via the home network communicator.

7. A method for sharing a channel map of digital broadcast in a home network, the method comprising:
connecting a Remote User Interface Client (RUIC) to a Remote User Interface Server (RUIS) having a channel map, the channel map including at least one digital broadcast channel, an occupied count field for indicating a number of Remote User Interface Clients (RUICs) using each of the at least one digital broadcast channel and an occupier indicator field including indicators of the RUICs using the at least one digital broadcast channel;
determining, when the RUIC requests deletion of a channel after displaying the at least one channel, a number of RUICs using the requested channel for deletion;
deleting, when the requested channel for deletion is used by only one RUIC, the requested channel for deletion from the channel map;
decrementing, when the requested channel for deletion is used by two or more RUICs, a value of the occupied count field corresponding to the requested channel for deletion by one; and
deleting the occupier indicator of the RUIC from the occupier indicator field corresponding to the requested channel for deletion; and
receiving and displaying, at the RUIC, at least one channel for which an occupier indicator corresponds to an occupier indicator of the RUIC,
wherein the channel map is shared by at least one RUIC and is used for managing a digital broadcast channel list of each of the at least one RUIC through the occupied count field and the occupier indicator field.

8. The method of claim 7, further comprising:
determining, at the RUIS when a request to add a channel is received from the RUIC after displaying the at least one channel, whether the requested channel for addition exists in the channel map;
adding, when the requested channel for addition does not exist in the channel map, the requested channel for addition to the channel map;
incrementing the value of the occupied count field corresponding to the requested channel for addition by one;
adding the occupier indicator of the RUIC to the occupier indicator field corresponding to the requested channel for addition;
incrementing, when the requested channel for addition exists in the channel map, the value of the occupied count field corresponding to the requested channel for addition by one; and
adding the occupier indicator of the RUIC to the occupier indicator field corresponding to the requested channel for addition.

9. A channel map sharing method of a Remote User Interface Server (RUIS) for digital broadcast in a home network, the method comprising:
storing a channel map comprising at least one digital broadcast channel, an occupied count field for indicating a number of Remote User Interface Clients (RUICs) using each of the at least one digital broadcast channel and an occupier indicator field including indicators of the RUICs using corresponding digital broadcast channel;
extracting at least one channel that an occupier indicator of the at least one channel corresponds to an occupier indicator of a RUIC in response to a request of the RUIC;
transmitting the at least one extracted channel to the RUIC;
determining, when the RUIC requests deletion of a channel after transmitting the at least one extracted channel, a number of RUICs using the requested channel for deletion;
deleting, when the requested channel for deletion is used by only one RUIC, the requested channel for deletion from the channel map;
decrementing, when the requested channel for deletion is used by two or more RUICs, a value of the occupied count field corresponding to the requested channel for deletion by one; and
deleting the occupier indicator of the RUIC from the occupier indicator field corresponding to the requested channel for deletion,
wherein the channel map is shared by at least one RUIC and is used for managing a digital broadcast channel list of each of the at least one RUIC through the occupied count field and the occupier indicator field.

10. The method of claim 9, further comprising:
adding, when the RUIC requests addition of a channel and the requested channel for addition does not exist in the channel map after transmitting the at least one extracted channel, the requested channel for addition to the channel map;
incrementing the value of the occupied count field corresponding to the requested channel for addition by one; and
adding the occupier indicator of the RUIC to the occupier indicator field corresponding to the requested channel for addition.

11. The method of claim 9, further comprising:
incrementing, when the requested channel for addition exists in the channel map, the value of the occupied count field corresponding to the requested channel for addition by one; and
adding the occupier indicator of the RUIC to the occupier indicator field corresponding to the requested channel for addition.

12. A channel map sharing method of a Remote User Interface Client (RUIC) for digital broadcast in a home network, the method comprising:
generating a request message for requesting channels for which a channel occupier indicator of the RUIC is included in a channel map which is stored in a Remote User Interface Server (RUIS), the channel map including at least one digital broadcast channel, an occupied count field for indicating a number of Remote User Interface Clients (RUICs) using each of the at least one digital broadcast channel and an occupier indicator field including indicators of the RUICs using the at least one digital broadcast channel;
transmitting the request message for requesting channels to the RUIS and receiving at least one channel that an occupier indicator of the at least one digital broadcast channel corresponds to an occupier indicator of the RUIC; and
displaying the received at least one channel;
generating a message requesting addition or deletion of a specific channel from the channel map after displaying the received at least one channel; and
transmitting the message requesting the addition or deletion via a home network communicator,
wherein the RUIC shares the channel map with other RUICs and manages a digital broadcast channel list through the occupied count field and the occupier indicator field independently of the other RUICs.

13. A method of updating a channel map stored in a Remote User Interface Server (RUIS), the method comprising:
receiving a request from a Remote User Interface Client (RUIC) to add or delete a channel from the channel map, the channel map including an occupier count field indicating a number of RUICs using each of a plurality of digital broadcast channels and an occupier indicator field including indicators of the RUICs using corresponding digital broadcast channels; and
updating the channel map based on the received request,
wherein the channel map is shared by at least one RUIC and is used for managing a digital broadcast channel list of each of the at least one RUIC through the occupied count field and the occupier indicator field, and
wherein when the request is a request to delete a channel, the updating of the channel map comprises:
determining a number of RUICs using the requested channel for deletion;
deleting, when the requested channel for deletion is used by only one RUIC, the channel from the channel map;
decrementing, when the requested channel for deletion is used by two or more, a value of the occupied count field corresponding to the requested channel for deletion by one; and
deleting the occupier indicator of the RUIC from the occupier indicator field corresponding to the requested channel for deletion.

14. The method of claim 13, wherein when the request is a request to add a channel, the updating of the channel map comprises:
determining whether the requested channel for addition exists in the channel map;
adding, when the requested channel for addition does not exist in the channel map, the requested channel for addition to the channel map;
incrementing the value of the occupied count field corresponding to the requested channel for addition by one;
adding an occupier indicator of the RUIC to the occupier indicator field corresponding to the requested channel for addition;
incrementing, when the requested channel for addition exists in the channel map, the value of the occupied count field corresponding to the requested channel for addition by one; and
adding the occupier indicator of the RUIC to the occupier indicator field corresponding to the requested channel for addition.

* * * * *